(12) United States Patent
Lietzau et al.

(10) Patent No.: US 8,197,709 B2
(45) Date of Patent: Jun. 12, 2012

(54) LIQUID-CRYSTALLINE COMPOUNDS

(75) Inventors: Lars Lietzau, Darmstadt (DE); Werner Binder, Dieburg (DE); Atsutaka Manabe, Bensheim (DE); Helmut Haensel, Muehltal (DE)

(73) Assignee: Merck Patent Gesellschaft mit berschrankter Haftung, Darmstadt (DE)

( * ) Notice: Subject to any disclaimer, the term of this patent is extended or adjusted under 35 U.S.C. 154(b) by 0 days.

(21) Appl. No.: 12/938,464

(22) Filed: Nov. 3, 2010

(65) Prior Publication Data

US 2011/0101271 A1    May 5, 2011

(30) Foreign Application Priority Data

Nov. 4, 2009   (DE) .......................... 10 2009 051 904

(51) Int. Cl.
*C09K 19/00* (2006.01)
*C09K 19/06* (2006.01)
*C09K 19/32* (2006.01)
*C09K 19/52* (2006.01)

(52) U.S. Cl. ............ 252/299.6; 252/299.01; 252/299.61; 252/299.63; 252/299.66; 430/20; 428/1.1; 570/126; 570/127; 570/128; 570/129; 549/374; 549/369

(58) Field of Classification Search .................... 430/20; 428/1.1; 252/299.01, 299.6, 299.61, 299.63, 252/299.66; 570/126–129; 549/369, 374
See application file for complete search history.

(56) References Cited

U.S. PATENT DOCUMENTS

| | | | |
|---|---|---|---|
| 7,951,433 B2 * | 5/2011 | Tanaka .......................... | 428/1.1 |
| 2005/0067605 A1 | 3/2005 | Lussem et al. | |
| 2009/0059157 A1 | 3/2009 | Haseba et al. | |
| 2010/0127211 A1 | 5/2010 | Tanaka | |

FOREIGN PATENT DOCUMENTS

| | | |
|---|---|---|
| DE | 10 2004 029 429 A1 | 2/2005 |
| EP | 2 116 522 A1 | 11/2009 |
| JP | 2005-120208 A | 5/2005 |
| JP | 2009-74050 A | 4/2009 |
| WO | WO 2008/105286 A1 | 9/2008 |

OTHER PUBLICATIONS

Search Report of EP 10 01 3534 (Feb. 14, 2011).

* cited by examiner

*Primary Examiner* — Geraldina Visconti
(74) *Attorney, Agent, or Firm* — Millen, White, Zelano & Branigan, P.C.

(57) ABSTRACT

The present invention relates to chemical compounds containing five or more benzene rings arranged in a linear manner and two bridging units between these rings, where at least one of these units represents a —$CF_2O$— bridge. The invention additionally relates to liquid-crystalline media and to high-frequency components comprising these media, in particular antennae, especially for the gigahertz range.

21 Claims, No Drawings

LIQUID-CRYSTALLINE COMPOUNDS

The present invention relates to novel chemical compounds containing five or more benzene rings and two bridging units between these rings, where at least one of these units represents a —CF$_2$O— bridge. The invention additionally relates to liquid-crystalline media and to high-frequency components comprising these media, in particular antennae, especially for the gigahertz range. The liquid-crystalline media serve, for example, for the phase shifting of microwaves for tuneable "phased-array" antennae.

Liquid-crystalline media have been used for some time in electro-optical displays (liquid crystal displays—LCDs) in order to display information. Compounds containing 5 rings and a —CF$_2$O— bridge have already been proposed for display devices, for example in the documents JP 2009-074050 and WO 2008/105286.

Recently, however, liquid-crystalline media have also been proposed for use in components for microwave technology, such as, for example, in DE 10 2004 029 429 A and in JP 2005-120208 (A).

An industrially valuable application of liquid-crystalline media in high-frequency technology is based on their property that their dielectric properties can be controlled, particularly for the gigahertz range, by a variable voltage. This enables the construction of tuneable antennae which do not contain any moving parts (A. Gaebler, A. Moessinger, F. Goelden, et al., "Liquid Crystal-Reconfigurable Antenna Concepts for Space Applications at Microwave and Millimeter Waves", International Journal of Antennas and Propagation, Vol. 2009, article ID 876989, 7 pages, 2009, doi: 10.1155/2009/876989).

DE 10 2004 029 429 A describes the use of conventional liquid-crystal media in microwave technology, inter alia in phase shifters. This document has already investigated liquid-crystalline media with respect to their properties in the corresponding frequency range.

However, the compositions or individual compounds known to date are generally afflicted with disadvantages. Most of them result, besides other deficiencies, in disadvantageously high losses and/or inadequate phase shifts or inadequate material quality.

For use in high-frequency technology, liquid-crystalline media having particular, hitherto rather unusual, uncommon properties, or combinations of properties, are required.

Novel components for liquid-crystalline media having improved properties are thus necessary. In particular, the loss in the microwave range must be reduced and the material quality (η) improved.

In addition, there is a demand for an improvement in the low-temperature behaviour of the components. An improvement in both the operating properties and the shelf life is necessary here.

Thus, there is a considerable demand for liquid-crystalline media having suitable properties for corresponding practical applications.

Surprisingly, it has now been found that it is possible, using the compounds according to the invention, to achieve liquid-crystalline media having a suitable nematic phase range and high Δn which do not have the disadvantages of the prior-art materials, or at least only do so to a considerably reduced extent.

The invention relates to compounds of the formula I

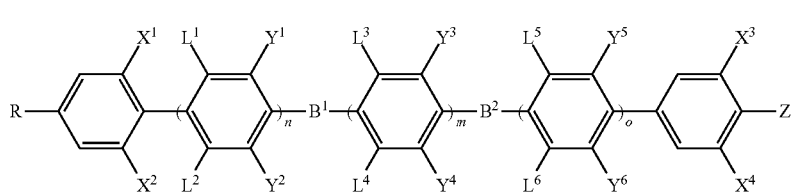

in which
B$^1$ denotes —CF$_2$O—, —CH$_2$O—, —CH$_2$—CH$_2$—, —CF$_2$CF$_2$—, —CH$_2$CF$_2$—, —CH=CH—, —CF=CF—, —CF=CH—, —(CO)O—, preferably —CF$_2$O—,
B$^2$ denotes —CF$_2$O—,
Z denotes F, Cl, SCN, NCS, CN, OCN, NCO, trifluoromethyl or trifluoromethoxy,
X$^{1-4}$, independently of one another, denote F, Cl or H, preferably F or H,
Y$^{1-6}$ independently of one another, denote H, F, Cl or T,
L$^{1-6}$ independently of one another, denote H or T,
T denotes alkyl, alkoxy, alkenyl, alkenyloxy or alkynyl having up to 6 carbon atoms, preferably having 1 to 3 carbon atoms, preferably alkyl,
R denotes an unsubstituted alkyl radical having 1 to 15 C atoms, where, in addition, one or more CH$_2$ groups in this radical may each be replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another,
F, Cl, Br, CN, CF$_3$, OCF$_3$, SCN, NCS or SF$_5$,
m denotes 2, 3 or 4, preferably 2, and
n, o, independently of one another, denote 0, 1 or 2, preferably 0 or 1
where m+n+o=3 or 4, preferably 4,
and where, in a preferred embodiment in the case where n=1, m=2 and o=0, in particular for n+m+o=3, at least one Y or L denotes a radical T. L$^3$ or L$^4$ particularly preferably denotes a radical T.

The compounds according to the invention have a relatively high clearing point, an extremely high dielectric anisotropy (Δε), a high optical anisotropy (Δn) and an advantageously high rotational viscosity about the longitudinal axis of the molecule, especially for T≠H. Alone or in a mixture with further mesogenic components, they have a nematic phase over a broad temperature range. These properties make them particularly suitable for use in components for high-frequency technology, in particular in liquid-crystalline phase shifters.

R preferably denotes an alkyl radical having 1 to 15 C atoms, where, in addition, one or more CH$_2$ groups in this radical may each be replaced, independently of one another, by —C≡C—, —CH=CH—, —(CO)O—, —O(CO)—, —(CO)— or —O— in such a way that O atoms are not linked directly to one another.

Illustrative embodiments of the invention are therefore the following structures:

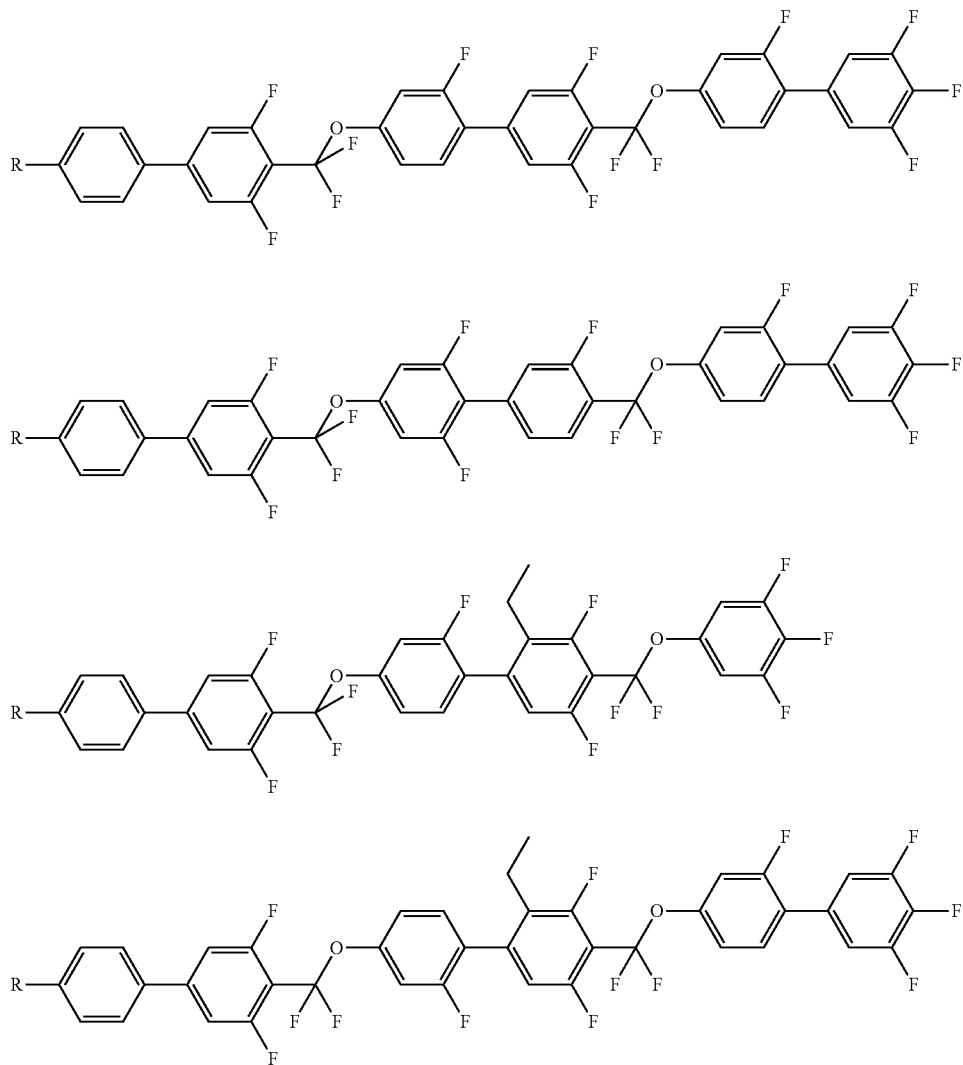

in which the variable groups are as defined above.

The compounds of the formula I can advantageously be prepared as can be seen in the following illustrative synthesis (Scheme 1):

The links between the benzene rings are generally formed by Suzuki coupling from correspondingly substituted aryl halides and boronic acid derivatives. If the benzene rings are linked by a —$CF_2O$— group, this unit is generally prepared Scheme 1. Illustrative synthesis of the compounds of the formula I. $R^1/R^1$ = $C_{1-6}$-alkyl or together optionally alkylated alkylene.

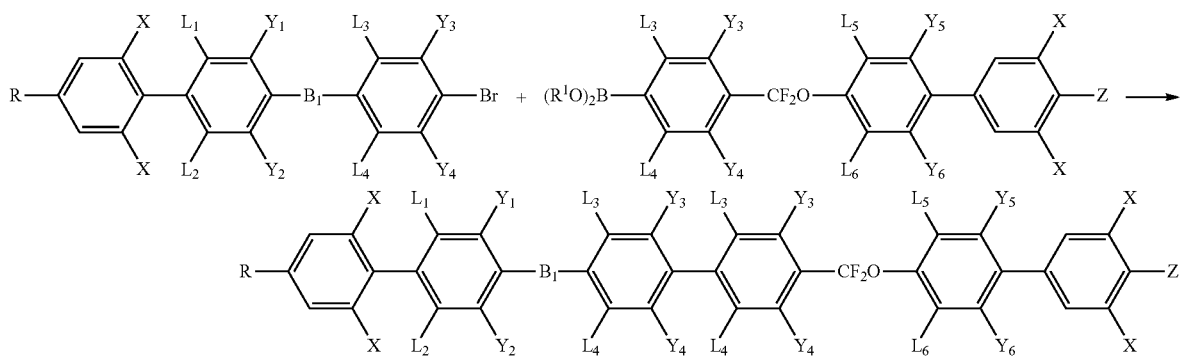

by an oxidative fluorination of dithioorthoesters, formed from the reaction of a bis(alkylthio)carbenium salt with a phenol derivative (cf., for example, EP 1259503 B1).

The liquid-crystalline media in accordance with the present invention comprise one or more compounds of the formula I and optionally at least one further, preferably mesogenic compound. The liquid-crystal medium therefore preferably comprises two or more compounds. Preferred media comprise the preferred compounds of the formula I.

Further components of the liquid-crystalline media are preferably selected from the compounds of the formula II:

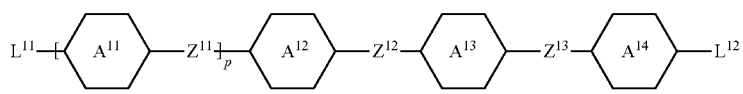

II in which $L^{11}$ denotes $R^{11}$ or $X^{11}$, $L^{12}$ denotes $R^{12}$ or $X^{12}$, $R^{11}$ and $R^{12}$, independently of one another, denote unfluorinated alkyl or unfluorinated alkoxy having 1 to 17, preferably 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl, $X^{11}$ and $X^{12}$, independently of one another, denote F, Cl, Br, —CN, —NCS, —SCN, —SF$_5$, fluorinated alkyl or fluorinated alkoxy having 1 to 7 C atoms or fluorinated alkenyl, fluorinated alkenyloxy or fluorinated alkoxyalkyl having 2 to 7 C atoms, preferably fluorinated alkoxy, fluorinated alkenyloxy, F or Cl, p denotes 0 or 1, $Z^{11}$ to $Z^{13}$, independently of one another, denote trans-CH=CH—, trans-CF=CF—, —C≡C— or a single bond, and

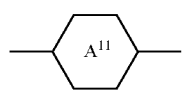

to

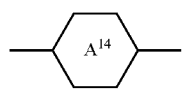

denote a) 1,4-phenylene, in which one or more, preferably one or two, CH groups may be replaced by N, b) trans-1,4-cyclohexylene or cyclohexenylene, in which, in addition, one or two non-adjacent CH$_2$ groups may be replaced by —O— and/or —S— and in which H may be replaced by F, c) 1,4-naphthylene, and in which, in groups a) and b), one or more H atoms may also be replaced by Br, Cl, F, CN, —NCS, —SCN, SF$_5$, C$_1$-C$_{10}$ alkyl, C$_3$-C$_6$ cycloalkyl, C$_1$-C$_{10}$ alkoxy or a mono- or polyfluorinated C$_1$-C$_{10}$ alkyl or alkoxy group, preferably denote, independently of one another,

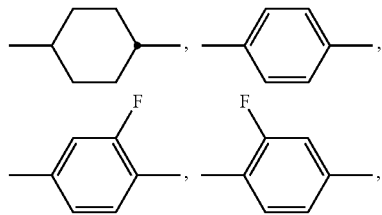

-continued

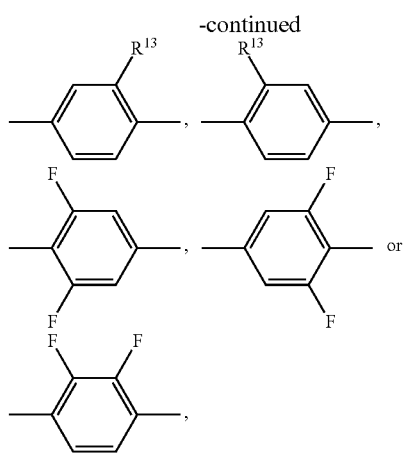

where $R^{13}$ denotes Cl, C$_{1-7}$-alkyl or C$_{3-6}$ cycloalkyl.

In a preferred embodiment of the present invention, the liquid-crystalline media comprise one or more compounds of the formula I and one or more compounds of the formula II.

The liquid-crystalline media in accordance with the present application preferably comprise in total 5 to 95%, preferably 10 to 90% and particularly preferably 15 to 80%, of compounds of the formula I.

The liquid-crystalline media in accordance with the present invention preferably comprise 10% or less, preferably 5% or less, particularly preferably 2% or less, very particularly preferably 1% or less, and in particular absolutely no compound having only two or fewer five- and/or six-membered rings.

The liquid-crystalline media in accordance with the present application preferably comprise in total 10 to 100%, preferably 20 to 95% and particularly preferably 25 to 90%, of compounds of the formulae I and II.

In accordance with the present invention, the compounds of the formula II are preferably used in a total concentration of 10% to 90%, more preferably 15% to 85%, even more preferably 25% to 80% and very preferably 30% to 75%, of the mixture as a whole.

In addition, the liquid-crystalline media may comprise further additives, such as stabilisers, chiral dopants and nanoparticles. The individual, added compounds are employed in concentrations of 0.01 to 6%, preferably 0.1 to 3%. However, the concentration data for the remaining constituents of the liquid-crystal mixtures, i.e. the liquid-crystalline or mesogenic compounds, are indicated without taking into account the concentration of these additives.

The liquid-crystalline media preferably comprise 0 to 10% by weight, in particular 0.01 to 5% by weight and particularly preferably 0.1 to 3% by weight, of stabilisers. The media preferably comprise one or more stabilisers selected from 2,6-di-tert-butylphenols, 2,2,6,6-tetramethylpiperidines or 2-benzotriazol-2-ylphenols. These assistants are known to the person skilled in the art and are commercially available, for example as light stabilisers.

An embodiment of the invention is therefore also a process for the preparation of a liquid-crystal medium which is characterised in that one or more compounds of the formula I are mixed with one or more compounds selected from the compounds of the formula II, as indicated above, and optionally with one or more further compounds and optionally with one or more additives.

In the present application, the expression dielectrically positive describes compounds or components where $\Delta\epsilon > 3.0$, dielectrically neutral describes those where $-1.5 \leq \Delta\epsilon \leq 3.0$ and dielectrically negative describes those where $\Delta\epsilon < -1.5$. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 µm. The voltage applied is a rectangular wave having a frequency of 1 kHz and an effective value of typically 0.5 V to 1.0 V, but it is always selected to be below the capacitive threshold of the respective test mixture.

$\Delta\epsilon$ is defined as $(\epsilon_\| - \epsilon_\perp)$, whereas $\epsilon_{average}$ is $(\epsilon_\| + 2\epsilon_\perp)/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The parameter ranges indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are quoted in per cent by weight and relate to the respective mixture as a whole, all temperatures are quoted in degrees Celsius and all temperature differences are quoted in differential degrees. All physical properties that are typical for liquid crystals are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta n$) is determined at a wavelength of 589.3 nm. The dielectric anisotropy ($\Delta\epsilon$) is determined at a frequency of 1 kHz. The threshold voltages, as well as all other electro-optical properties, are determined using test cells produced at Merck KGaA, Germany. The test cells for the determination of $\Delta\epsilon$ have a cell thickness of approximately 20 µm. The electrode is a circular ITO electrode having an area of 1.13 cm² and a guard ring. The orientation layers are SE-1211 from Nissan Chemicals, Japan, for homeotropic orientation ($\epsilon_\|$) and polyimide AL-1054 from Japan Synthetic Rubber, Japan, for homogeneous orientation ($\epsilon_\perp$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here. The characteristic voltages are determined under perpendicular observation. The threshold ($V_{10}$), mid-grey ($V_{50}$) and saturation ($V_{90}$) voltages are determined for 10%, 50% and 90% relative contrast, respectively.

The liquid-crystalline media are investigated with respect to their properties in the microwave frequency range as described in A. Penirschke, S. Muller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548.

Compare in this respect also A. Gaebler, F. Gölden, S. Müller, A. Penirschke and R. Jakoby "Direct Simulation of Material Permittivites . . . ", 12MTC 2009—International Instrumentation and Measurement Technology Conference, Singapore, 2009 (IEEE), pp. 463-467, and DE 10 2004 029 429 A, in which a measurement method is likewise described in detail.

The liquid crystal is introduced into a polytetrafluoroethylene (PTFE) capillary. The capillary has an internal radius of 180 µm and an external radius of 350 µm. The effective length is 2.0 cm. The filled capillary is introduced into the centre of the cavity with a resonance frequency of 30 GHz. This cavity has a length of 6.6 mm, a width of 7.1 mm and a height of 3.6 mm. The input signal (source) is then applied, and the result of the output signal is recorded using a commercial vector network analyser.

The change in the resonance frequency and the Q factor between the measurement with the capillary filled with the liquid crystal and the measurement without the capillary filled with the liquid crystal is used to determine the dielectric constant and the loss angle at the corresponding target frequency by means of equations 10 and 11 in A. Penirschke, S. Muller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548, as described therein.

The values for the components of the properties perpendicular and parallel to the director of the liquid crystal are obtained by alignment of the liquid crystal in a magnetic field. To this end, the magnetic field of a permanent magnet is used. The strength of the magnetic field is 0.35 tesla. The alignment of the magnet is set correspondingly and then rotated correspondingly through 90°.

The dielectric anisotropy in the microwave range is defined as $$\Delta\epsilon_r = (\epsilon_{r,\|} - \epsilon_{r,\perp}).$$

The modulatability or tuneability (τ) is defined as

τ≡(Δ∈$_r$/∈$_{r,∥}$).

The material quality (η) is defined as

η=(τ/tan δ$_{∈r,max}$), with the maximum dielectric loss factor tan δ$_{∈r,max}$:

tan δ$_{∈r,max}$=max.{tan δ$_{∈r,⊥}$; tan δ$_{∈r,∥}$} which arises from the maximum value of the measured values for tan δ$_{∈r}$.

The material quality (η) of the preferred liquid-crystal materials is 5 or more, preferably 6 or more, preferably 8 or more, preferably 10 or more, preferably 15 or more, preferably 17 or more, particularly preferably 20 or more and very particularly preferably 25 or more.

In the corresponding components, the preferred liquid-crystal materials have phase shifter qualities of 15°/dB or more, preferably 20°/dB or more, preferably 30°/dB or more, preferably 40°/dB or more, preferably 50°/dB or more, particularly preferably 80°/dB or more and very particularly preferably 100°/dB or more.

In the present application, the term compounds means both one compound and a plurality of compounds, unless expressly stated otherwise.

The liquid-crystal media according to the invention preferably have nematic phases of in each case at least from −20° C. to 80° C., preferably from −30° C. to 85° C. and very particularly preferably from −40° C. to 100° C. The phase particularly preferably extends to 120° C. or more, preferably to 140° C. or more and very particularly preferably to 180° C. or more. The expression have a nematic phase here means on the one hand that no smectic phase and no crystallisation are observed at low temperatures at the corresponding temperature and on the other hand that no clearing occurs on heating from the nematic phase. The investigation at low temperatures is carried out in a flow viscometer at the corresponding temperature and checked by storage in test cells having a cell thickness of 5 μm for at least 100 hours. At high temperatures, the clearing point is measured in capillaries by conventional methods.

The liquid-crystal media in accordance with the present invention preferably have a clearing point of 90° C. or more, more preferably 100° C. or more, even more preferably 120° C. or more, particularly preferably 150° C. or more and very particularly preferably 170° C. or more.

The Δ∈ of the liquid-crystal medium in accordance with the invention, at 1 kHz and 20° C., is preferably 1 or more, more preferably 2 or more and very preferably 3 or more.

The Δn of the liquid-crystal media in accordance with the present invention, at 589 nm (Na$^D$) and 20° C., is preferably in the range from 0.20 or more to 0.90 or less, more preferably in the range from 0.25 or more to 0.90 or less, even more preferably in the range from 0.30 or more to 0.85 or less and very particularly preferably in the range from 0.35 or more to 0.80 or less.

In a preferred embodiment of the present application, the Δn of the liquid-crystal media in accordance with the present invention is preferably 0.50 or more, more preferably 0.55 or more.

Furthermore, the liquid-crystal media according to the invention are characterised by high anisotropies in the microwave range. The birefringence is, for example, preferably 0.14 or more, particularly preferably 0.15 or more, particularly preferably 0.20 or more, particularly preferably 0.25 or more and very particularly preferably 0.30 or more, at about 8.3 GHz. In addition, the birefringence is preferably 0.80 or less.

In some embodiments, however, liquid crystals having a negative value of the dielectric anisotropy can also advantageously be used.

The liquid crystals employed are either individual substances or mixtures. They preferably have a nematic phase.

Preferred components which comprise a liquid-crystal medium or at least one compound in accordance with the invention are phase shifters, varactors, antenna arrays (for example for radio, mobile communications, microwave/radar and other data transmission), 'matching circuit adaptive filters' and others. Preference is given to components for high-frequency technology, as defined above. Preference is also given to components which can be modulated by different applied electrical voltages. Very particularly preferred components are phase shifters. In preferred embodiments, a plurality of phase shifters are functionally connected, giving, for example, a phase-controlled group antenna. A group antenna uses the phase shift of the transmitting or receiving elements arranged in a matrix in order to achieve bundling through interference. A parallel arrangement of phase shifters in row or grid form enables the construction of a so-called 'phased array', which can serve as tuneable transmitting or receiving antenna for high frequencies (for example gigahertz range). Phased array antennae according to the invention have a very broad usable reception cone.

Preferred applications are radar installations and data transmission equipment on manned or unmanned vehicles from the automobile, shipping, aircraft, space travel and satellite technology areas.

For the production of suitable components, in particular phase shifters, a liquid-crystalline medium according to the invention is typically introduced into rectangular cavities having a cross section of less than 1 mm and a length of several centimeters. The cavities have opposing electrodes mounted along two long sides. Such arrangements are familiar to the person skilled in the art. Through application of a variable voltage, the dielectric properties of the liquid-crystalline medium can be tuned in later operation in order to set different frequencies or directions of an antenna.

The term "alkyl" preferably encompasses straight-chain and branched alkyl groups having 1 to 15 carbon atoms, in particular the straight-chain groups methyl, ethyl, propyl, butyl, pentyl, hexyl and heptyl. Groups having 2 to 10 carbon atoms are generally preferred.

The term "alkenyl" preferably encompasses straight-chain and branched alkenyl groups having 2 to 15 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_5$- to $C_7$-5-alkenyl and $C_7$-6-alkenyl, in particular $C_2$- to $C_7$-1 E-alkenyl, $C_4$- to $C_7$-3E-alkenyl and $C_5$- to $C_7$-4-alkenyl.

Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "alkoxy" preferably encompasses straight-chain radicals of the formula $C_nH_{2n+1}$—O—, in which n denotes 1 to 10. n is preferably 1 to 6. Preferred alkoxy groups are, for example, methoxy, ethoxy, n-propoxy, n-butoxy, n-pentoxy, n-hexoxy, n-heptoxy, n-octoxy, n-nonoxy, n-decoxy.

The term "oxaalkyl" or "alkoxyalkyl" preferably encompasses straight-chain radicals of the formula $C_nH_{2n+1}$—O—$(CH_2)_m$, in which n and m each, independently of one another, denote 1 to 10. Preferably, n is 1 and m is 1 to 6.

The term "fluorinated alkyl radical" preferably encompasses mono- or polyfluorinated radicals. Perfluorinated radicals are included. Particular preference is given to $CF_3$, $CH_2CF_3$, $CH_2CHF_2$, $CHF_2$, $CH_2F$, $CHFCF_3$ and $CF_2CHFCF_3$.

The term "fluorinated alkoxy radical" preferably encompasses mono- or polyfluorinated radicals. Perfluorinated radicals are included. Particular preference is given to $OCF_3$.

In the present application, high-frequency technology means applications having frequencies in the range from 1 MHz to 1 THz, preferably from 1 GHz to 500 GHz, more preferably 2 GHz to 300 GHz, particularly preferably from 5 to 150 GHz.

The liquid-crystal media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and liquid-crystal compounds of the liquid-crystal media in this application.

The liquid-crystal media according to the invention consist of a plurality of compounds, preferably 3 to 30, more preferably 4 to 20 and very preferably 4 to 16, compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called pre-mixes, which can be, for example, homologous or eutectic mixtures of compounds, or using so-called "multibottle" systems, the constituents of which are themselves ready-to-use mixtures.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present application, high-frequency technology means applications having frequencies in the range from 1 MHz to 1 THz, preferably from 1 GHz to 500 GHz, preferably 2 GHz to 300 GHz, particularly preferably from about 5 to 150 GHz. The application is preferably in the microwave spectrum or adjacent regions suitable for communications transfer in which 'phased array' modules can be used in transmitting and receiving antennae.

In the present application and in the following examples, the structures of the liquid-crystal compounds are indicated by means of acronyms, where the transformation into chemical formulae is carried out in accordance with Tables A and B below. All radicals $C_nH_{2n+1}$ and $C_mH_{2m+1}$ are straight-chain alkyl radicals having n and m C atoms respectively; n, m and k are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nOCF$_3$ | $C_nH_{2n+1}$ | $OCF_3$ | H | H |
| nOCF$_3$.F | $C_nH_{2n+1}$ | $OCF_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are given in Tables A and B.

TABLE A

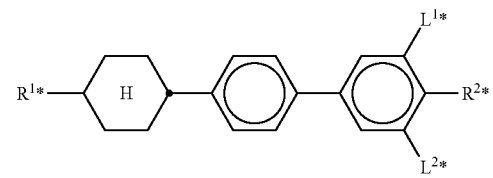

BCH

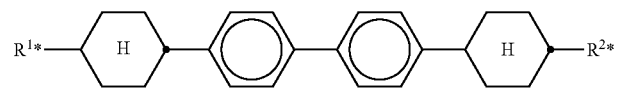

CBC

TABLE A-continued
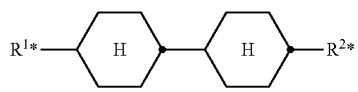
CCH
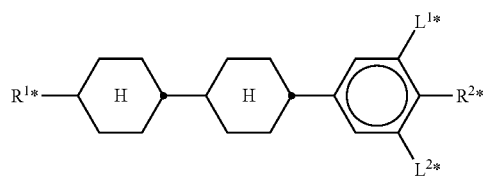
CCP
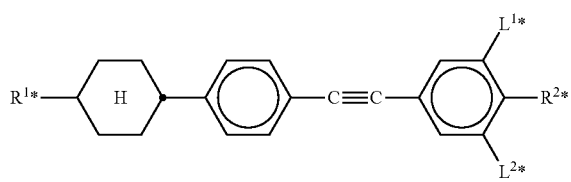
CPTP
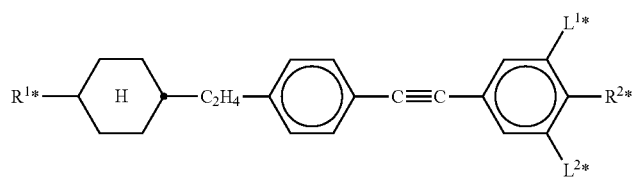
CEPTP
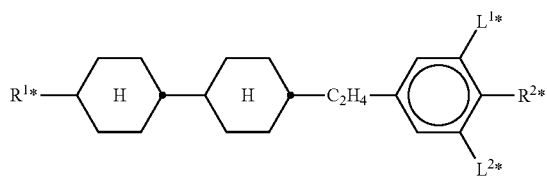
ECCP
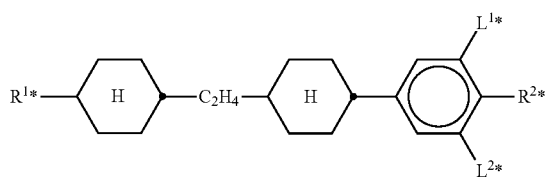
CECP
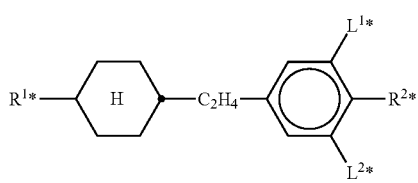
EPCH TABLE A-continued
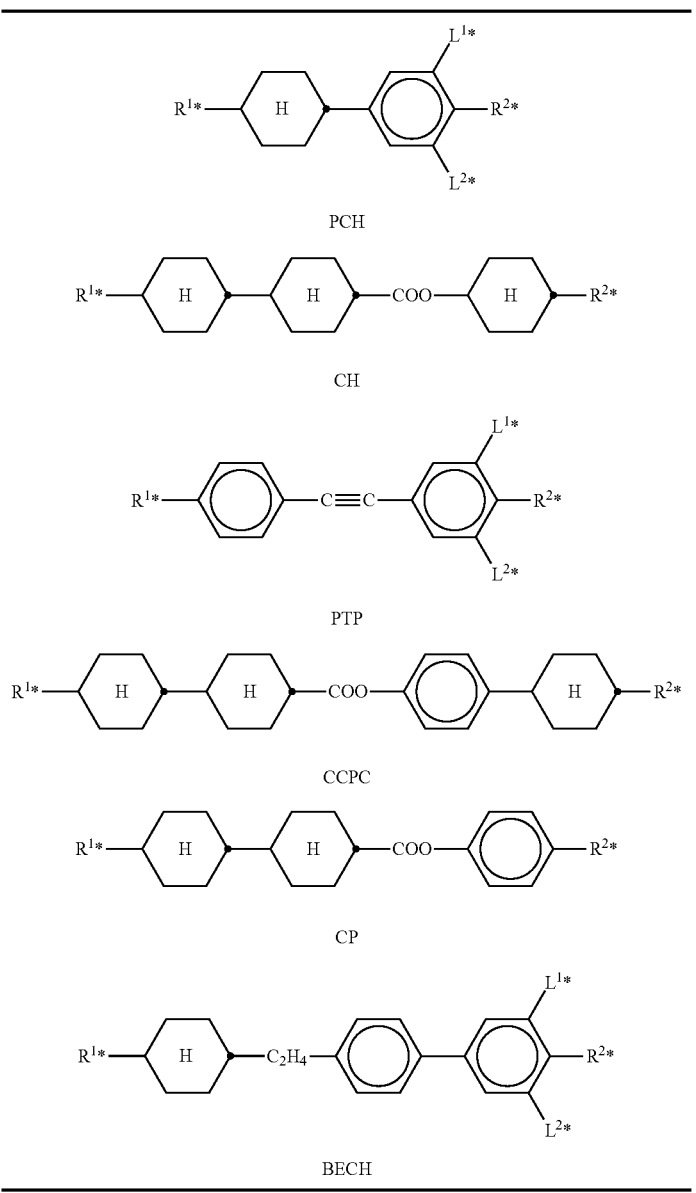
TABLE B
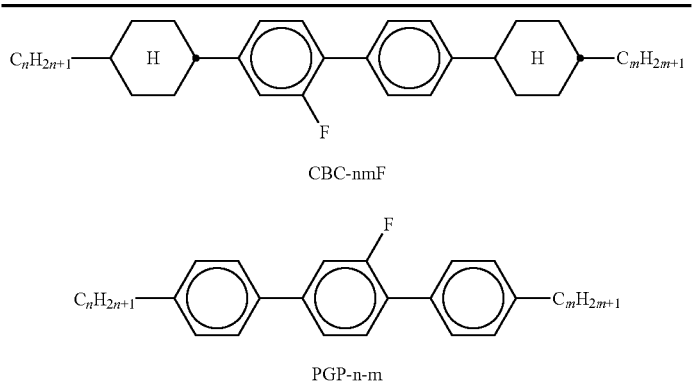

TABLE B-continued

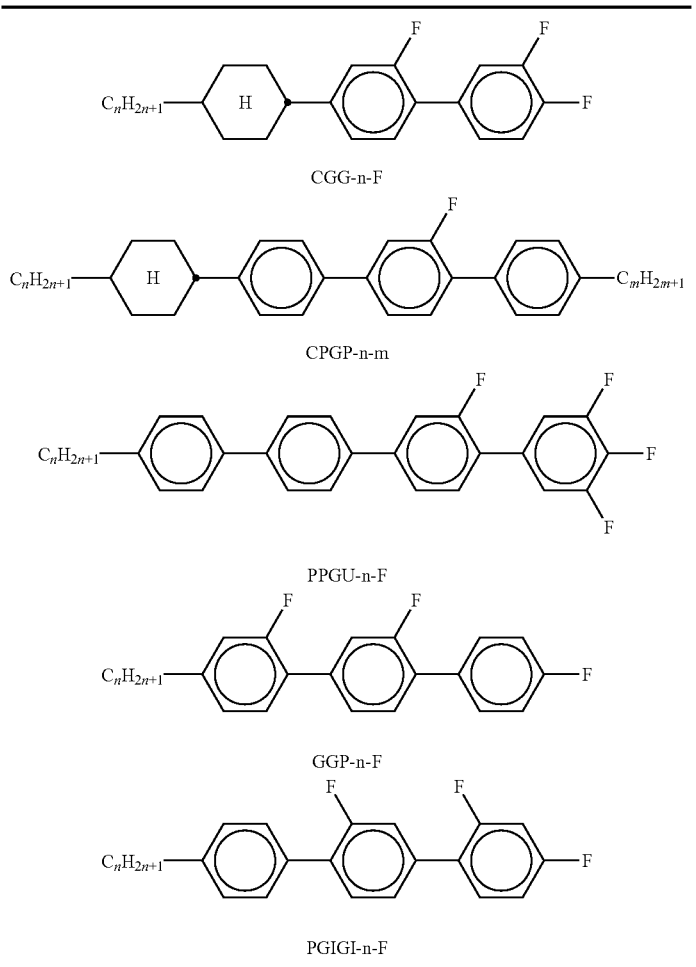

The following examples illustrate the present invention without limiting it in any way.

However, it becomes clear to the person skilled in the art from the physical properties what properties can be achieved and in what ranges they can be modified. In particular, the combination of the various properties which can preferably be achieved is thus well defined for the person skilled in the art

EXAMPLES

The acetylenes employed, if not commercially available, are synthesised by standard laboratory procedures.

Synthesis Examples 1.1)

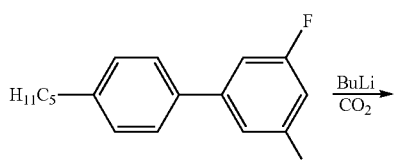

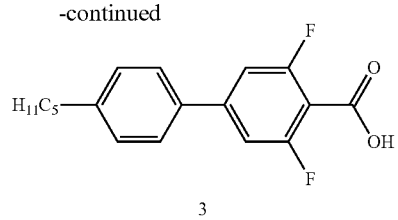

3

120 g (430 mmol) of the biphenyl 2 are dissolved in 500 ml of THF, and 188 ml (470 mmol) of a 2.5 M solution of n-butyllithium in n-hexane is added at −70° C. After 30 min at this temperature, $CO_2$ is passed into the apparatus, and the batch is diluted with cooled THF, with the internal temperature being kept below 60° C. After the reaction has subsided, the reaction mixture is stirred with water −30° C. and acidified using hydrochloric acid. The organic phase is evaporated, and the residue is crystallised from isopropanol.

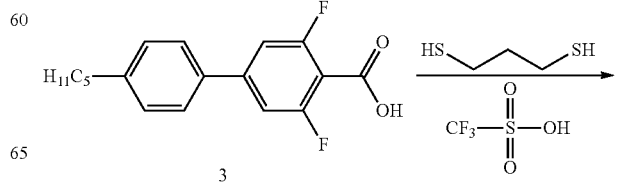

3

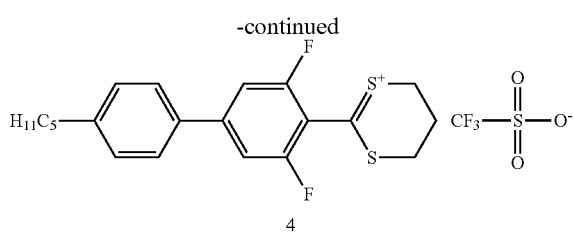

Under a nitrogen atmosphere, 111 g (370 mmol) of the acid 3, 47 ml (480 mmol) of propanedithiol, 42 ml (480 mmol) of trifluoromethanesulfonic acid, 145 ml of toluene and 145 ml of isooctane are combined and heated at the boil on a water separator. When the formation of water is complete, 400 ml of dibutyl ether are added to the batch at 80° C., and 1000 ml of diethyl ether are added at room temperature. The mixture is subsequently cooled to 0° C. The precipitated solid is filtered off with suction and dried.

1.2)

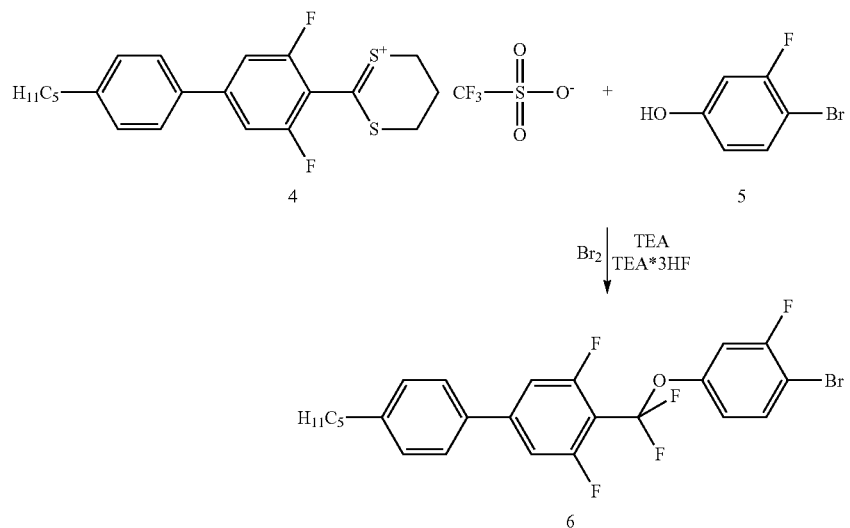

A mixture of 39 ml (280 mmol) of triethylamine and 54 g (280 mmol) of the phenol 5 dissolved in 200 ml of dichloromethane is added to a suspension of 124 g (240 mmol) of the triflate 4 in 400 ml of dichloromethane at 20° C., and the mixture is stirred for a further 60 min. 77 g (480 mmol) of triethylamine trishydrofluoride are subsequently added to the batch at −70° C. After 60 min at −70° C., 15 ml (600 mmol) of bromine dissolved in 30 ml of dichloromethane are added. After 30 min, the batch is warmed to −30° C. over the course of 75 min, and 41 ml (480 mmol) of morpholine are added. After 1 h at 0° C., 150 ml of 47% potassium hydroxide solution are added to the reaction mixture on 600 g of ice/water mixture. The organic phase is extracted with dichloromethane, and the combined organic phases are dried and evaporated. The residue is extracted with n-heptane, and the extract is filtered through silica gel.

1.3) Compound 9 is prepared analogously to the above procedures.

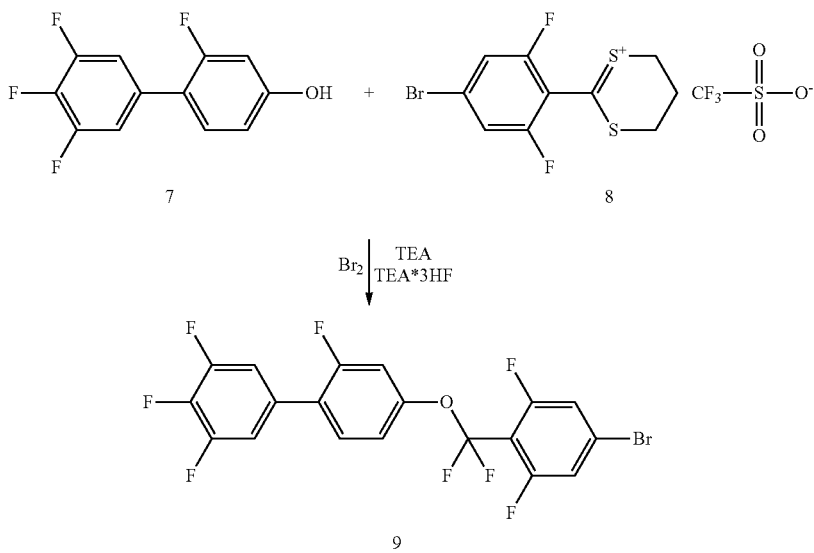

1.4)

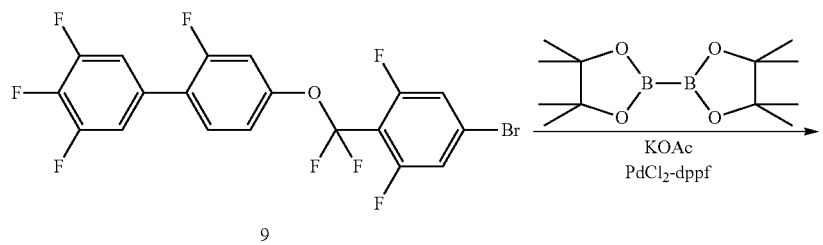

9

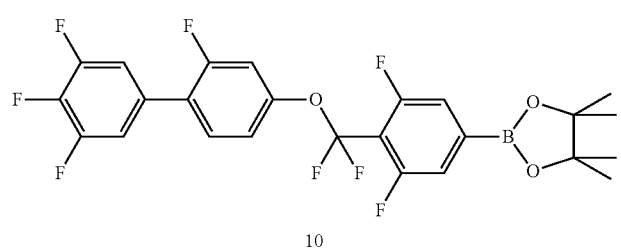

10

Under a nitrogen atmosphere, 75 g (160 mmol) of the bromide 9 are dissolved in 580 ml of dioxane, and 49 g (190 mmol) of bis(pinacolato)-diboron are added. 43 g (440 mmol) of potassium acetate and 3.4 g of PdCl$_2$-dppf are subsequently added to the mixture, which is then warmed at 100° C. for 6 h. 1000 ml of MTB ether and 300 ml of water are added to the batch at room temperature. The aqueous phase is extracted with MTB ether, and the combined organic phases are washed with water and sodium chloride solution, dried and evaporated. The residue is passed through silica gel, and the product obtained is crystallised from ethanol.

1.5)

6 g (20 mmol) of sodium metaborate octahydrate are initially introduced in 15 ml of water, and 30 ml of THF, 286 mg (0.4 mmol) of bis(triphenyl-phosphine)palladium(II) chloride and 0.05 ml (0.4 mmol) of hydrazinium hydroxide are added, and the mixture is stirred at room temperature for 5 min. 10 g (20 mmol) of the bromide 6 and 10.6 g (20 mmol) of the boronic ester 10 dissolved in 70 ml of THF are subsequently added. The batch is heated under reflux for 8 h. After cooling, the batch is diluted with 200 ml of MTB ether. The organic phase is evaporated, and the residue is crystallised from n-heptane/toluene (9:1) and acetone.

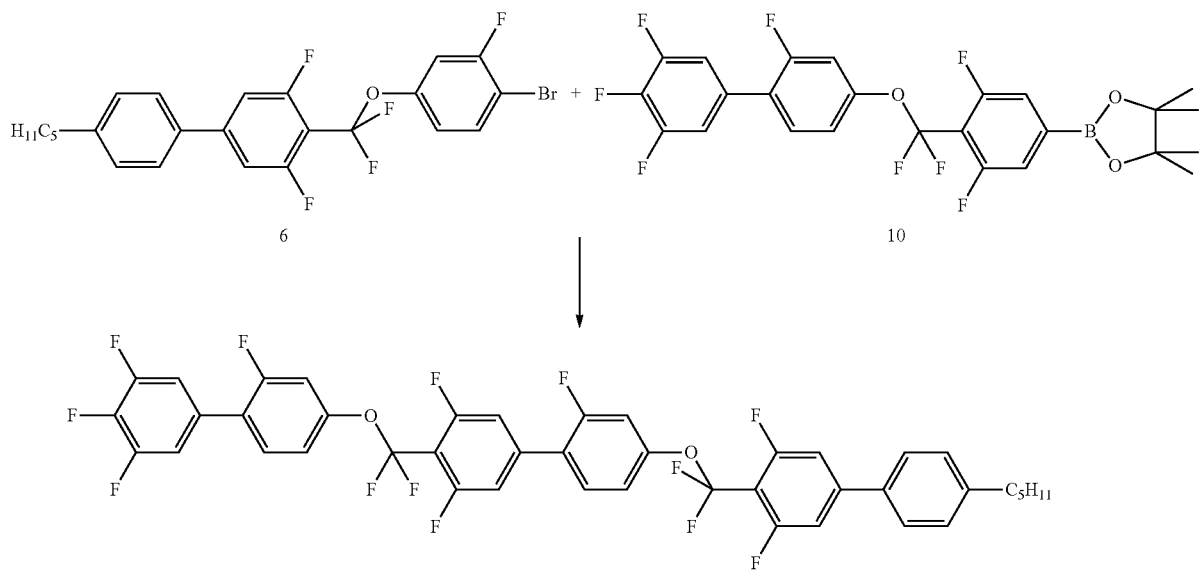

11

Δε=+42.5
Δn=0.211
γ₁=5890 mPa·s
C 86 N 236 I 2.1)

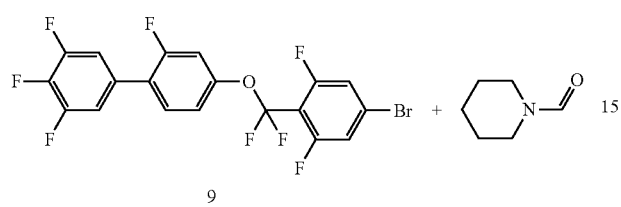

9

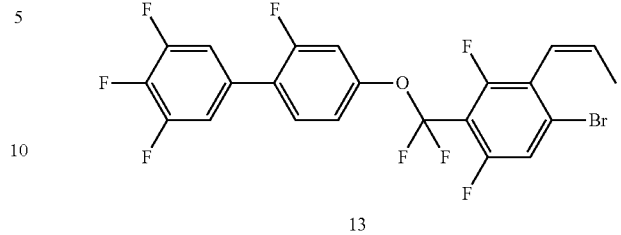

13

Under nitrogen, 5.4 g (14 mmol) of ethyltriphenylphosphonium bromide are suspended in 100 ml of THF, and 1.5 g (13 mmol) of potassium tert-butoxide are added at 0° C. After 30 min, a solution of 6.1 g (12 mmol) of the aldehyde 12 is added. The mixture is stirred at room temperature for 60 h. Water is subsequently added to the batch, which is then acidified using hydrochloric acid and diluted with heptane. The organic phase is washed with sodium hydrogencarbonate solution, dried and evaporated. The residue is passed through silica gel (heptane).

2.3)

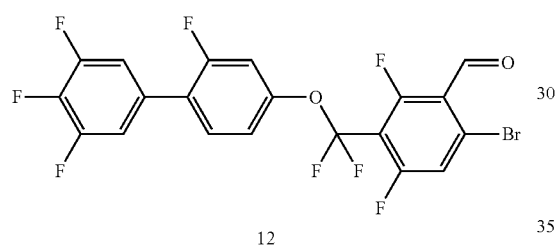

12

Under nitrogen, 35 ml (55 mmol) of a 15% solution of butyllithium in hexane are added to a solution of 8.6 ml (50 mmol) of 2,2,6,6-tetramethylpiperidine in THF at −20° C., and the mixture is stirred for 20 min. This solution is added at −70° C. to a solution of 24 g (50 mmol) of the bromide 9. After 1 h, 5.6 ml (50 mmol) of N-formylpiperidine dissolved in 30 ml of THF are added. The cooling is subsequently removed. The batch is hydrolysed at −10° C. and acidified using hydrochloric acid. The organic phase is washed with sodium hydrogencarbonate solution, dried and evaporated. The residue is passed through silica gel (chlorobutane).

2.2)

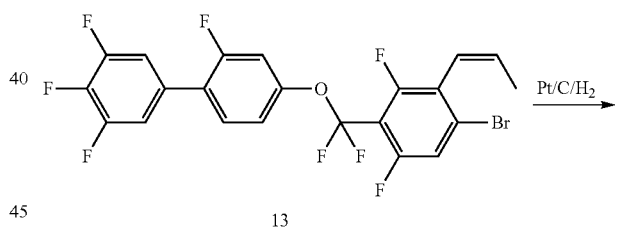

13

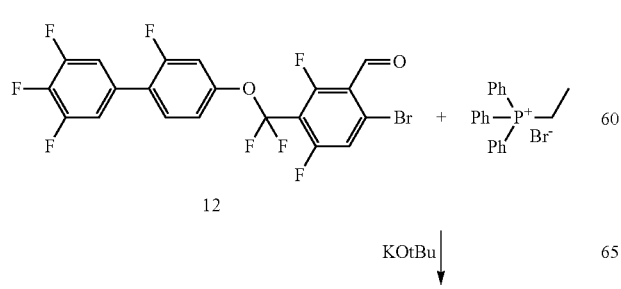

14

2.2 g (4.2 mmol) of the styrene 13 are dissolved in 20 ml of THF and hydrogenated on a platinum catalyst. The solution is evaporated and passed through silica gel (heptane).

2.4) The synthesis of the boronic ester 15 is carried out analogously to the above procedure 1.4.

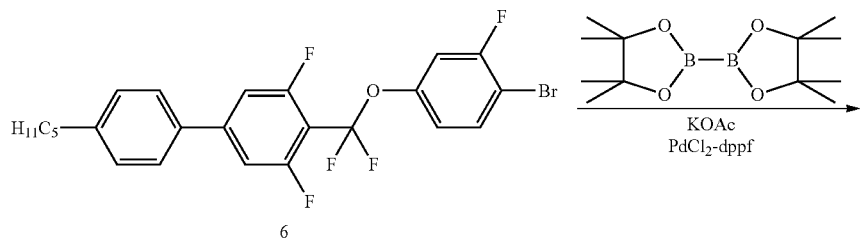

2.5) The synthesis of 16 is carried out analogously to the preparation of 11 (Example 1.5).

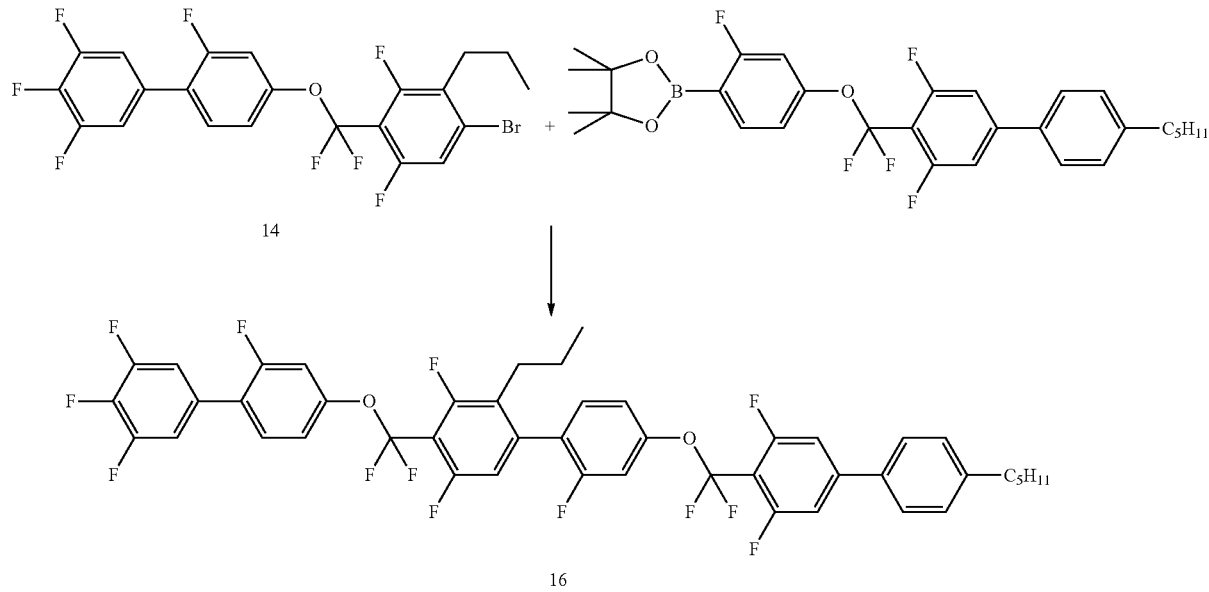

Δε=+35.5
Δn=0.159
γ₁=8584 mPa·s
C 80 SmA (39) N 101 I

Mixture Example 1

A liquid-crystal mixture having the composition and properties as indicated in the following table is prepared. Component (16) is the compound from Synthesis Example 2.5).

| No. | Composition Compound Abbreviation | |
|---|---|---|
| 1 | BCH-3F.F | 10.8% |
| 2 | BCH-5F.F | 9.00% |
| 3 | ECCP-30CF3 | 4.50% |
| 4 | ECCP-50CF3 | 4.50% |
| 5 | CBC-33F | 1.80% |
| 6 | CBC-53F | 1.80% |

| | | |
|---|---|---|
| 7 | CBC-55F | 1.80% |
| 8 | PCH-6F | 7.20% |
| 9 | PCH-7F | 5.40% |
| 10 | CCP-20CF3 | 7.20% |
| 11 | CCP-30CF3 | 10.8% |
| 12 | CCP-40CF3 | 6.30% |
| 13 | CCP-50CF3 | 9.90% |
| 14 | PCH-5F | 9.00% |
| 15 | (16) | 10.0% |
| Σ | | 100% |

| Physical properties | |
|---|---|
| T(N, I) = | 101° C. |
| Δn (20° C., 589.3 nm) = | 0.108 |
| Δε (20° C., 1 kHz) = | 9 |

This liquid-crystalline mixture is used for applications in the microwave area, in particular for a phase shifter ('phased array').

Further combinations of the embodiments and variants of the invention in accordance with the description also arise from the following claims.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosure[s] of all applications, patents and publications, cited herein and of corresponding German application No. DE 10 2009 051 904.1, filed Nov. 4, 2009, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A compound of formula I

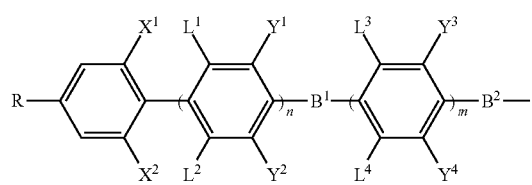

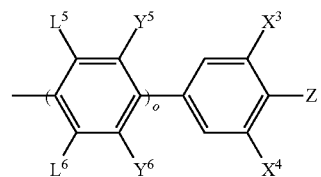

in which
$B^1$ denotes —$CF_2O$—, —$CH_2O$—, —$CH_2$—$CH_2$—, —$CF_2CF_2$—, —$CH_2CF_2$—, —CH=CH—, —CF=CF—, —CF=CH—, —C≡C—, or —(CO)O—,
$B^2$ denotes —$CF_2O$—,
Z denotes F, Cl, SCN, NCS, CN, OCN, NCO, trifluoromethyl or trifluoromethoxy,
$X^{1-4}$ independently of one another, denote F, Cl, or H,
$Y^{1-6}$ independently of one another, denote H, F, Cl or T,
$L^{1-6}$ independently of one another, denote H or T,
T denotes alkyl, alkoxy, alkenyl, alkenyloxy or alkynyl having up to 6 carbon atoms,
R denotes an unsubstituted alkyl radical having 1 to 15 C atoms, in which one or more $CH_2$ groups are optionally replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another,
or denotes F, Cl, Br, CN, $CF_3$, $OCF_3$, SCN, NCS or $SF_5$,
m denotes 2, 3 or 4, and
n denotes 0, 1 or 2,
o denotes 1,
where m+n+o=3 or 4.

2. A compound according to claim 1, wherein $B^1$ denotes a —$CF_2O$— group.

3. A compound according to claim 1, wherein m=2.

4. A compound according to claim 1, wherein n and o are both 1.

5. A compound according to claim 1, wherein $L^3$ or $L^4$ denotes T.

6. A compound according to claim 1, wherein R is an alkyl radical having 1 to 15 C atoms, in which one or more $CH_2$ groups are optionally replaced, independently of one another, by —C≡C—, —CH=CH—, —(CO)O—, —O(CO)—, —(CO)— or —O— in such a way that O atoms are not linked directly to one another.

7. A liquid-crystal medium, comprising one or more compounds of formula I according to claim 1 and at least one further liquid-crystalline compound.

8. A liquid-crystal medium according to claim 7, which comprises one or more compounds of formula II:

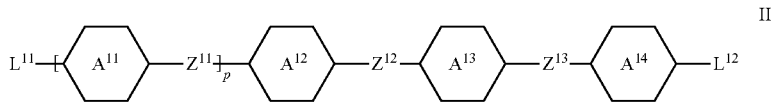

in which $L^{11}$ denotes $R^{11}$ or $X^{11}$, $L^{12}$ denotes $R^{12}$ or $X^{12}$, $R^{11}$ and $R^{12}$ independently of one another, denote unfluorinated alkyl or unfluorinated alkoxy having 1 to 17 C atoms or unfluorinated alkenyl, unfluorinated alkenyloxy, or unfluorinated alkoxyalkyl having 2 to 15 C atoms, $X^{11}$ and $X^{12}$ independently of one another, denote F, Cl, Br, —CN, —NCS, —SCN, —SF$_5$, fluorinated alkyl or fluorinated alkoxy having 1 to 7 C atoms or fluorinated alkenyl, fluorinated alkenyloxy or fluorinated alkoxyalkyl having 2 to 7 C atoms, p denotes 0 or 1, $Z^{11}$ to $Z^{13}$ independently of one another, denote trans-CH=CH—, trans-CF=CF—, —C≡C— or a single bond, and

To

independently of one another, denote a) 1,4-phenylene, in which one or more CH groups may be replaced by N, b) trans-1,4-cyclohexylene or cyclohexenylene, in which one or two non-adjacent CH$_2$ groups may be replaced by —O— and/or —S— and in which H may be replaced by F, c) 1,4-Naphthylen, and in groups a) and b), one or more H atoms may be replaced by Br, Cl, F, CN, —NCS, —SCN, SF$_5$, C$_1$-C$_{10}$ alkyl, C$_3$-C$_6$ cycloalkyl, C$_1$-C$_{10}$ alkoxy or a mono- or polyfluorinated C$_1$-C$_{10}$ alkyl or alkoxy group.

9. A liquid-crystal medium according to claim 7, wherein the concentration of the compounds of formula I in the medium is in the range of in total 5% to 95%.

10. A liquid-crystal medium according to claim 8, wherein

To

independently of one another, denote a) 1,4-phenylene, in which one or two CH groups may be replaced by N, b) trans-1,4-cyclohexylene or cyclohexenylene, in which one or two non-adjacent CH$_2$ groups may be replaced by —O— and/or —S— and in which H may be replaced by F, c) 1,4-Naphthylen, and in groups a) and b), one or more H atoms may be replaced by Br, Cl, F, CN, —NCS, —SCN, SF$_5$, C$_1$-C$_{10}$ alkyl, C$_3$-C$_6$ cycloalkyl, C$_1$-C$_{10}$ alkoxy or a mono- or polyfluorinated C$_1$-C$_{10}$ alkyl or alkoxy group.

11. A liquid-crystal medium according to claim 8, wherein $R^{11}$ and $R^{12}$ independently of one another, denote unfluorinated alkyl or unfluorinated alkoxy having 3 to 10 C atoms or unfluorinated alkenyl, unfluorinated alkenyloxy, or unfluorinated alkoxyalkyl having 3 to 10 C atoms.

12. A process for preparing a liquid-crystal medium according to claim 7, comprising mixing together one or more compounds of formula I with one or more further liquid-crystalline compounds and optionally with one or more additives.

13. A process for preparing a liquid-crystal medium according to claim 8, comprising mixing together one or more compounds of formula I with one or more compound of formula II, and optionally with one or more further liquid-crystalline compounds and optionally with one or more additives.

14. A component for a high-frequency technology product, comprising a liquid-crystal medium according to claim 7.

15. A component according to claim 14, which is one or more functionally connected phase shifters.

16. A phase-controlled group antenna, comprising one or more components according to claim 14.

17. A compound of formula I

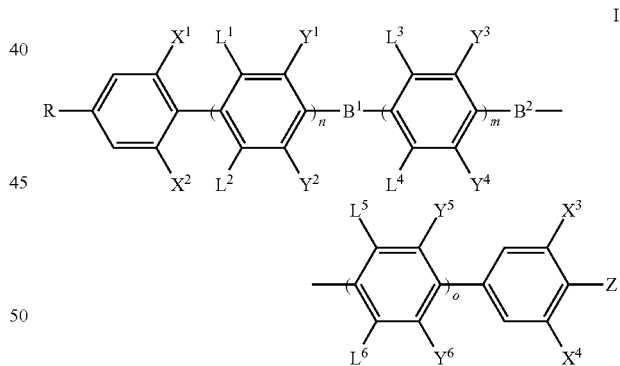

in which $B^1$ denotes —CF$_2$O—, —CH$_2$O—, —CH$_2$—CH$_2$—, —CF$_2$CF$_2$—, —CH$_2$CF$_2$—, —CH=CH—, —CF=CF—, —CF=CH—, —C≡C—, or —(CO)O—, $B^2$ denotes —CF$_2$O—, Z denotes F, Cl, SCN, NCS, CN, OCN, NCO, trifluoromethyl or trifluoromethoxy, $X^{1-4}$ independently of one another, denote F, Cl, or H, $Y^{1-6}$ independently of one another, denote H, F, Cl or T, $L^{1-6}$ independently of one another, denote H or T, wherein at least one of $Y^{1-6}$ and $L^{1-6}$ denotes T, T denotes alkyl, alkoxy, alkenyl, alkenyloxy or alkynyl having up to 6 carbon atoms, R denotes an unsubstituted alkyl radical having 1 to 15 C atoms, in which one or more $CH_2$ groups are optionally replaced, independently of one another, by —C≡C—, —CH=CH—, —CF=CF—, —CF=CH—, —CH=CF—, —(CO)O—, —O(CO)—, —(CO)— or —O— in such a way that O atoms are not linked directly to one another, or denotes F, Cl, Br, CN, $CF_3$, $OCF_3$, SCN, NCS or $SF_5$, m denotes 2, 3 or 4, and n, o independently of one another, denote 0, 1 or 2, where m+n+o=3 or 4.

18. A compound according to claim 17, wherein $B^1$ denotes a —$CF_2O$— group.

19. A compound according to claim 17, wherein m=2.

20. A compound according to claim 17, wherein n and o are both 1.

21. A compound according to claim 17, wherein $L^3$ or $L^4$ denotes T.

* * * * *